United States Patent
Nagashima et al.

[11] Patent Number: 6,127,492
[45] Date of Patent: Oct. 3, 2000

[54] THERMOPLASTIC RESIN COMPOSITION AND HEAT-RESISTANT TRAY FOR IC

[75] Inventors: Tohru Nagashima; Mituo Maeda, both of Tsukuba; Hiroshi Nakamura, Tsuchiura, all of Japan

[73] Assignee: Sumitomo Chemical Company, Limited, Osaka, Japan

[21] Appl. No.: 09/309,256

[22] Filed: May 11, 1999

[30] Foreign Application Priority Data

May 13, 1998 [JP] Japan .................................. 10-130200

[51] Int. Cl.⁷ .................................................. C08F 283/02
[52] U.S. Cl. ......................... 525/461; 528/196; 528/198; 528/271; 528/272
[58] Field of Search ..................... 528/196, 198, 528/271, 272; 525/461

[56] References Cited

U.S. PATENT DOCUMENTS 3,365,517  1/1968  Barth ....................................... 528/196

FOREIGN PATENT DOCUMENTS

| | | |
|---|---|---|
| 0000733 A1 | 2/1979 | European Pat. Off. . |
| 0133907 A1 | 3/1985 | European Pat. Off. . |
| 45-39181 | 12/1970 | Japan . |
| 49-13855 | 4/1974 | Japan . |
| 54-28361 | 3/1979 | Japan . |
| 60-51739 | 3/1985 | Japan . |

*Primary Examiner*—Terressa M. Boykin
*Attorney, Agent, or Firm*—Birch, Stewart, Kolasch & Birch, LLP

[57] ABSTRACT

A thermoplastic resin composition in which 5 to 45 parts by weight of carbon fiber and 0.1 to 10 parts by weight of conductive carbon black are compounded per 100 parts by weight of resin components comprising an aromatic polycarbonate resin and an aromatic polysulfone resin. The thermoplastic resin composition is excellent in heat-resistance and mechanical strength, and heat-resistant IC trays therefrom are useful products which can endure drying of IC at high temperature and are excellent in handling properties.

6 Claims, No Drawings

THERMOPLASTIC RESIN COMPOSITION AND HEAT-RESISTANT TRAY FOR IC

BACKGROUND OF THE INVENTION

1. Field of the Invention

The present invention relates to a thermoplastic resin composition having antistatic properties and conductivity, and a heat-resistant tray for IC obtained by molding the same.

2. Description of the Related Art

As trays for carrying IC parts (chips), there have been conventionally used vinyl chloride resins, polystyrene resins, polypropylene resins and the like to which conductivity and antistatic properties had been imparted.

In mounting IC parts on a printed board by soldering, water vapor is generated in the IC parts by soldering heat, such that blistering and cracking can occur and injure the IC parts if a package of the IC parts is wet, therefore, it is necessary to remove moisture at a temperature of 120° C. to 150° C. before mounting. Conventionally, it has been necessary to transfer IC parts from a carrying tray to on an aluminum die-cast tray in this drying process. However, recently, such a tray having a carrying property and drying property together has been developed using a modified polyphenylene ether resin endowed with conductivity or antistatic properties, and has pervaded. However, when the time needed for drying of IC parts is shortened, a high temperature of for example 150° C. or more is required, and regarding a tray composed of modified polyphenylene ether resin, no tray made thereof has heretofore been satisfactory in the points of heat-resistance, minimizing warping of a molded article, molding processability and the like.

On the other hand, an aromatic polycarbonate resin has excellent mechanical strength and dimensional accuracy, however, it has a heat-resistant critical temperature of at most 150° C. Then, for the purpose of improving heat-resistance and the like, various thermoplastic resin compositions obtained by mixing aromatic polycarbonate resins with aromatic polysulfone resins have been disclosed.

For example, Japanese Patent Application Publication (JP-B) No. 45-39181 discloses a production of a composition that is excellent in heat-resistance and mechanical properties by mixing an aromatic polysulfone resin with an aromatic polycarbonate resin.

Further, JP-B No. 49-13855 describes that compositions composed of aromatic polysulfone resins and aromatic polycarbonate resins have more excellent heat-resistance and mechanical properties as compared with ABS resins.

Moreover, in Japanese Patent Application Laid-Open (JP-A) No. 54-28361, there is disclosed that a composition composed of an aromatic polycarbonate resin and aromatic polysulfone resin having a weight-average molecular weight of over 60,000 has improved chemical resistance and deflection temperature under load as compared with other various resins.

Furthermore, JP-A No. 60-51739 discloses that a composition composed of an aromatic polysulfone resin and an aromatic polycarbonate resin is excellent in mechanical properties and has improved chemical-resistance.

However, the above-described compositions often have unsatisfactory physical properties, since aromatic polycarbonate resins inhibit excellent physical properties represented by heat-resistance originally owned by aromatic polysulfone resins. Further, the above-described publications have no description regarding use of the compositions in he at-resis tant trays for IC.

In addition, for imparting antistatic property or conductivity required in heat-resistant trays for IC, a carbon fiber or conductive carbon black is generally compounded, however, this causes problems in that the resulting molded article generates an anisotropy in surface resistance, and the surface resistance of the molded article varies due to a slight change in the compounding amount, and the like.

An object of the present invention is to provide a thermoplastic resin composition having excellent heat-resistance and molding properties, and having antistatic property or conductivity, and a heat-resistant tray for IC obtained by molding the same.

SUMMARY OF THE INVENTION

The present inventors have investigated intensively for solving the above-described problems, and as a result, have found that the above-described object is accomplished by compounding carbon fiber and conductive carbon black into an aromatic polycarbonate resin and an aromatic polysulfone resin.

Namely, the present invention is as follows.

(1) A thermoplastic resin composition in which 5 to 45 parts by weight of carbon fiber and 0.1 to 10 parts by weight of a conductive carbon black having a DBP (dibutyl phthalate) oil absorption of 150 ml/100 g or more are compounded per 100 parts by weight of resin components comprising 15 to 55% by weight of an aromatic polycarbonate resin and 85 to 45% by weight of an aromatic polysulfone resin.

(2) The thermoplastic resin composition according to the item (1), wherein the ratio ($\eta a/\eta b$) of the melt viscosity ($\eta a$) of an aromatic polycarbonate resin to the melt viscosity ($\eta b$) of an aromatic polysulfone resin as defined below is from 0.5 to 2.0:

$\eta a$: melt viscosity of an aromatic polycarbonate resin measured at a temperature of 340° C. and a shearing rate of 1216/second;

$\eta b$: melt viscosity of an aromatic polysulfone resin measured at a temperature of 340° C. and a shearing rate of 1216/second.

(3) The thermoplastic resin composition according to the item (2), wherein the ratio ($\eta a/\eta b$) is from 0.8 to 1.8.

(4) The thermoplastic resin composition according to the item (1), (2) or (3), wherein the aromatic polycarbonate resin is a copolycarbonate or homopolycarbonate using at least 30 mol % or more of bisphenol A as a production material thereof.

(5) The thermoplastic resin composition according to the item (1), (2) or (3), wherein the aromatic polysulfone resin contains 80 mol % or more of a repeating unit represented by the following formula:

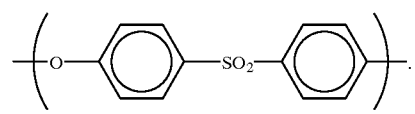

(6) A heat-resistant tray for IC obtained by molding the thermoplastic resin composition of the item (1), (2), (3), (4) or (5).

DETAILED DESCRIPTION OF THE INVENTION

The aromatic polycarbonate resin used in the present invention is a homopolymer, copolymer or a mixture thereof containing a repeating unit represented by the following general formula:

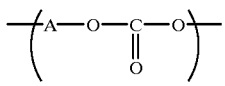

wherein, A represents a divalent aromatic residue which is a residue of a raw material divalent phenol.

The divalent phenol which can be used for producing such an aromatic polycarbonate is a mononuclear or polynuclear aromatic compound containing as functional groups two hydroxyl groups directly bonded to aromatic carbon atoms respectively. Examples of the divalent phenol include 2,2-bis(4-hydroxyphenyl)propane(bisphenol A), bis(4-hydroxyphenyl)methane, 2,2-bis(4-hydroxy-3-methylphenyl)propane, 2,2-(3,5,3',5'-tetrachloro-4,4'-hydroxyphenyl)propane, 2,2-(3,5,3',5'-tetrabromo-4,4'-hydroxyphenyl)propane, 1,1-bis(4-hydroxyphenyl)cyclohexane, hydroquinoline, resorcinol, dihydroxydiphenyl and the like, without being limited thereto.

This aromatic polycarbonate resin is preferably a copolycarbonate or homopolycarbonate using at least 30 mol % or more of bisphenol A as a raw material thereof. The terminal structure is determined by each production method, examples of the terminal group include OH, OC(CH$_3$)$_3$ and the like, without being limited thereto. Examples of commercially available products thereof include CALIBRE (trade name) 200-3, 200-20 and the like manufacture by Sumitomo Dow Co., Ltd. without being limited thereto.

The melt viscosity measured at a temperature of 340° C. and a shearing rate of 1216/second of an aromatic polycarbonate resin used in the present invention is suitably from 2000 to 10000 poise, and more suitably from 2000 to 6000 poise. A melt viscosity over 10000 poise is not preferable since then the molding process becomes difficult due to the high melt viscosity of the composition.

The aromatic polysulfone resin used in the present invention is defined as a polyarylene compound in which an arylene unit, ether bond and sulfone bond are essential three constituent units and the arylene unit is situated randomly ororderlytogetherwiththeetherandsulfonebonds. Typical examples thereof include those containing repeating units as described below without being limited thereto.

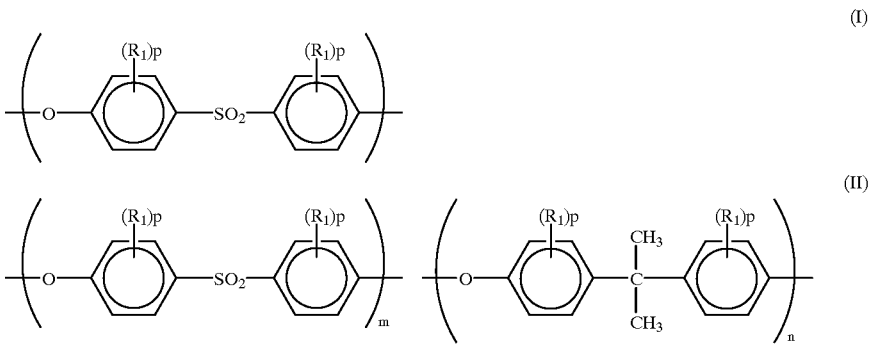

Compounds containing the unit (II) include random copolymers. In the above formulas, R$_1$ represents an alkyl group having 1 to 6 carbon atoms, an alkenyl group having 3 to 10 carbon atoms, phenyl group or halogen atom, p represents an integer from 0 to 4. Each of m and n represents an average number of the repeating unit from 0.1 to 100. Each R1 on the same or different nuclei may be different each other. And, each p may be different each other.

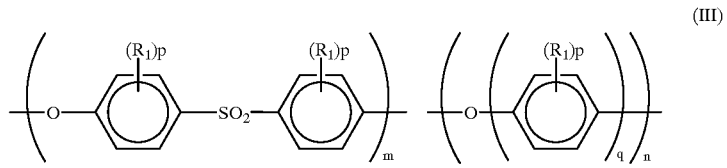

Compounds containing the unit (III) include random copolymers. In the formula (III), R$_1$ represents an alkyl group having 1 to 6 carbon atoms, alkenyl group having 3 to 10 carbon atoms, phenyl group or halogen atom, p represents an integer from 0 to 4. Each of q, m and n represents an average number of the repeating unit from 0.1 to 100. Each R1 on the same or different nuclei may be different each other. And, each p may be different each other.

In an aromatic polysulfone resin used in the present invention, (m/m+n) in the repeating unit represented by (II) or (III) is preferably 0.8 or more. Further, q in the constituent unit (III) is preferably 1.

Among them, those containing the repeating unit (I) or (II) are suitable, and those containing the repeating unit (I) are more suitable. Examples of commercially available resins containing the repeating unit (I) include SUMIKAEXCEL PES 3600P, 4100P and the like manufactured by Sumitomo Chemical Co., Ltd. and those containing the repeating unit (II) include UDEL P-1700 (trade name) manufactured by Amoco Performance Products, Inc., and the like without being limited thereto. The terminal structure is determined by various production methods, examples of the terminal group include Cl, OH, OR (R represents an alkyl group) and the like, without being limited thereto.

The melt viscosity measured at a temperature of 340° C. and a shearing rate of 1216/second of an aromatic polysulfone resin used in the present invention is suitably from 1000 to 6000 poise, and more suitably from 1000 to 3000 poise. A melt viscosity over 6000 poise is not preferable since then the molding process becomes difficult due to the high melt viscosity of the composition.

The ratio ($\eta a/\eta b$) of the melt viscosity ($\eta a$) of an aromatic polycarbonate resin (a) to the melt viscosity ($\eta b$) of an aromatic polysulfone resin (b) used in the present invention measured at a temperature of 340° C. and a shearing rate of 1216/second is suitably from 0.5 to 2.0, more suitably from 0.8 to 1.8, and most suitably from 1.0 to 1.6.

The amount of an aromatic polycarbonate resin to be compounded in the resin composition of the present invention is from 15 to 55% by weight, preferably from 25 to 45% by weight based on the total weight of an aromatic polysulfone resin and an aromatic polycarbonate resin. An amount of 55% by weight or more of an aromatic polycarbonate resin is not preferable since then the heat-resistance of the composition deteriorates.

Carbon fiber used in the present invention is a fibrous material in which 90% or more by weight of the chemical composition is composed of carbon, and as raw materials thereof, polyacrylonitrile, pitch, regenerated cellulose and the like can be used. A material obtained by treating at 1000 to 2000° C. a fibrous precursor spun using these raw materials or a material which is graphitized at 2000 to 3000° C. is generally used since it exhibits high strength and high elasticity.

The fiber length and fiber diameter of carbon fiber used in the present invention are not particularly restricted, and carbon fiber having a fiber length of 30 $\mu$m to 6 mm and a fiber diameter of 5 to 20 $\mu$m is generally used. Examples of the commercially available product include BESFIGHT (trade name) HTA-C6-CS and THA-CMF-0160N/S manufactured by Toho Rayon Co., Ltd., Donacarbo (trade name) S-231 and S-244 manufactured by Donac Co., Ltd., and the like, without being limited thereto.

The compounding amount of carbon fiber used in the present invention is from 5 to 45 parts by weight based on 100 parts by weight of resin components composed of an aromatic polycarbonate resin and an aromatic polysulfone resin.

An amount of carbon fiber less than 5 parts by weight is not preferable since then the antistatic property required for a heat-resistant tray for IC is not satisfied, while an amount over 45 parts by weight is not preferable since then due to raised melt viscosity of the composition, processing into an IC tray becomes difficult, and anisotropy in surface resistance of the molded article is not sufficiently solved even if conductive carbon black is added.

The compounding amount is suitably from 5 to 25 parts by weight, more suitably from 5 to 15 parts by weight.

Conductive carbon black used in the present invention has a DBP oil absorption of 150 ml/100 g or more. The DBP (dibutyl phthalate) oil absorption means the oil absorption defined in ASTM-D2414-88. Use of conductive carbon black having a DBP oil absorption less than 150 ml/100 g is not preferable, since then for imparting antistatic property required for a heat-resistant tray for IC, the amount added of conductive carbon black is raised and the melt viscosity of the composition increases This leads to difficulty in processing into an IC tray and reduction in mechanical strength of an IC tray. Though the upper limit is not particularly limited, the amount is suitably 750 ml/100 g or less in practice for the convenience in production. Examples of commercially available carbon black include KETJENBLACK (trade name) EC manufactured by Lion Akzo Co., Ltd., having a DBP oil absorption of 350 mlg/100 g, Vulcan (trade name) XC-72 manufactured by Cabot corporation having a DBP oil absorption of 215 ml/100 g, and the like, without being limited thereto. Further, it is also possible to use two or more conductive carbon blacks having different DBP oil absorptions.

The compounding amount of conductive carbon black used in the present invention is from 0.1 to 10 parts by weight based on 100 parts by weight of resin components composed of an aromatic polycarbonate resin and an aromatic polysulfone resin. An amount of conductive carbon black of less than 0.1 part by weight is not preferable since then problems occur in that anisotropy in surface resistance of the molded article is not solved, and resistance varies due to slight change in amount added. On the other hand, an amount of a conductive carbon black over 10 parts by weight is not preferable since then processing into an IC tray becomes difficult due to increasing of melt viscosity.

For solving anisotropy in surface resistance of the molded article while maintaining excellent processability, the amount of carbon black is preferably from 1 to 5 parts by weight.

In the present invention, there can be optionally added one or more of fibrous or needle reinforcing agents such as glass fiber, silica alumina fiber, alumina fiber, aluminum borate whisker and the like, inorganic fillers such as talc, mica, clay, glass bead and the like, release improving agents such as fluorine resins and metal soaps, coloring agents such as dyes, pigments and the like, and usual additives such as antioxidants, heat stabilizers, ultraviolet ray absorbers, surfactants and the like.

In particular, it is preferable to compound talc or clay in an amount of 3 to 10 parts by weight for reducing warping of a tray.

Further, there can also be added one or more of a small amount of thermoplastic resins, for example, polyethylene, polypropylene, polyvinyl chloride, ABS resin, polystyrene, methacrylic resin, polyamide, polyester, polyphenylene sulfide, polyether ketone, polyphenylene ether and modified materials thereof, polyether imide and the like, a small amount of thermosetting resins, for example, a phenol resin, epoxy resin, cyanate resin, isocyanate resin, polyimide resin and the like, a small amount of rubber components, and the like.

The means for compounding raw materials for obtaining the resin composition of the present invention is not particularly restricted. For example, one can generally mix together an aromatic polycarbonate resin, an aromatic polysulfone resin, optionally a reinforcing material and inorganic filler such as glass fiber and the like, a release improving agent, a heat stabilizer and the like by using a Henschel mixer, tumbler and the like, and then, melt-kneading the mixture using an extruder. For this melt-kneading, all raw materials may be mixed together before being fed to an extruder, or optionally, raw materials such as a reinforcing material and inorganic filler like glass fiber may be fed separately from raw materials mainly comprising resins.

The method for producing a molded article made of the thermoplastic resin composition of the present invention is not particularly limited. For melting, shaping and solidifying a resin, extrusion molding, injection molding, blowmolding and the like are listed, and among them, injection molding is preferably used. Further, the extruded molded article may also be processed by cutting or pressing.

As the heat-resistant tray for IC (also called chip tray) of the present invention, a tray equipped with a square pocket, a tray equipped with a rectangular pocket and the like are listed.

The thermoplastic resin composition of the present invention can be suitably used as a molding material of, in addition to a heat-resistant tray for IC, parts of automobiles, airplanes and the like, industrial instruments, domestic electric appliances, table wares and medical instruments, OA, AV instruments, electric parts, for example, semiconductor wafer carrier, LCD carrier, TAB tape carrier, IC socket and the like for which heat-resistance is required.

EXAMPLES

Examples of the present invention will be shown below, however, they do not limit the scope of the present invention.

In the examples, melt viscosity, deflection temperature under load, Izod impact strength, bending strength and surface resistance were measured according to the following methods.

(1) Melt viscosity:

Melt viscosities of an aromatic polycarbonate resin and an aromatic polysulfone resin were measured at a die diameter of 1 mm, a temperature of 340° C. and a shearing rate of 1216/second using Capirograph 1B manufactured by Toyo Seiki Seisakusho Ltd.

(2) Deflection temperature under load

A test piece having a length of 127 mm, a width of 12.7 mm and a thickness of 6.4 mm was molded from a thermoplastic resin composition using an injection molding machine, and deflection temperature under load was measured at a load of 18.6 $kg/cm^2$ according to ASTM D648.

(3) Izod impact strength

The test piece made in (2) was bisected to form test pieces for measuring Izod impact strength, and Izod impact strength was measured using the resulted test pieces according to ASTM D-256.

(4) Bending strength

The test piece made in (2) was used as a test piece for measuring bending strength, and bending strength was measured according to ASTM D-790.

(5) Surface resistance

A test piece having an edge size of 64 mm and a thickness of 3 mm was molded from thermoplastic resin composition using an injection molding machine, electrodes are adhered to edges of the molded article respectively using a conductive paste, and surface resistances in the resin flow direction (MD) and in vertical direction to the flow (TD) in injection-molding were measured at a voltage of 250 V using an insulation testor (PDM-256 manufactured by Sanwa Electric Instrument Co., Ltd.).

Examples 1 to 5, Comparative Examples 1 to 3

Several aromatic polycarbonate resins (trade name: CALIBRE, manufactured by Sumitomo Dow Co., Ltd.) and several aromatic polysulfone resins (trade name: SUMI-KAEXCEL PES, manufactured by Sumitomo Chemical Co., Ltd.) having different melt viscosities measured by the above-described method, carbon fiber (trade name: BESFIGHT, manufactured by Toho Rayon Co., Ltd.) and conductive carbon black having a DBP oil absorption of 150 mlg/100 g or more (trade name: KETJENBLACK, manufactured by Lion Akzo Co., Ltd.) were mixed as shown in Table 1 by a Henschel mixer, the resulting mixtures were peletized using a twin-screw extruder (PCM-30, manufactured by Ikegai Corporation) at a cylinder temperature of 340° C., to obtain a thermoplastic resin composition. The melt viscosities of respective resins were measured by the above-described method.

The above-described test pieces were molded from these thermoplastic resin compositions using an injection molding machine (PS40E5ASE manufactured by Nissei Plastic Industrial Co., Ltd.) at a cylinder temperature of 350° C. and a mold temperature of 120° C., and the deflection temperature under load, Izod impact strength, bending strength and surface resistance were measured, and the results are shown in Table 2.

TABLE 1

| | Formulation of resin composition | | | | | | |
|---|---|---|---|---|---|---|---|
| | Aromatic polycarbonate resin (a) | | Aromatic polysulfone resin (b) | | Carbon | Conductive | |
| | (wt %) | $\eta_a$ (poise) | (wt %) | $\eta_b$ (poise) | fiber Weight | carbon black Weight | Others Weight |
| Example 1 | 40 | 3500 | 60 | 2200 | 8.7 | 2.0 | 0 |
| Example 2 | 40 | 3500 | 60 | 2200 | 8.7 | 2.0 | Clay 5.3 |
| Example 3 | 40 | 3500 | 60 | 2200 | 8.7 | 2.0 | Talc 5.3 |
| Example 4 | 40 | 3500 | 60 | 5300 | 8.7 | 2.0 | 0 |
| Comparative example 1 | 40 | 3500 | 60 | 2200 | 8.7 | 0 | 0 |
| Comparative example 2 | 40 | 3500 | 60 | 2200 | 3.1 | 1.0 | 0 |
| Comparative example 3 | 60 | 3500 | 40 | 2200 | 8.7 | 2.0 | 0 |
| Comparative example 4 | 40 | 3500 | 60 | 2200 | 45 | 25 | 0 |

TABLE 2

| | $\eta_a/\eta_b$ | Deflection temperature under load (° C.) | Izod impact strength (unnotched) (kgcm/cm) | Bending strength (kg/cm$^2$) | Surface resistance ($\Omega$) | |
|---|---|---|---|---|---|---|
| | | | | | MD | TD |
| Example 1 | 1.6 | 206 | 45 | 1480 | $10^5$ | $10^7$ |
| Example 2 | 1.6 | 207 | 42 | 1430 | $10^5$ | $10^6$ |

TABLE 2-continued

|  | $\eta_a/\eta_b$ | Deflection temperature under load (°C.) | Izod impact strength (unnotched) (kgcm/cm) | Bending strength (kg/cm²) | Surface resistance (Ω) MD | TD |
|---|---|---|---|---|---|---|
| Example 3 | 1.6 | 206 | 39 | 1450 | $10^5$ | $10^7$ |
| Example 4 | 0.7 | 186 | 36 | 1450 | $10^5$ | $10^7$ |
| Comparative example 1 | 1.6 | 207 | 51 | 1450 | $10^5$ | $10^9$ |
| Comparative example 2 | 1.6 | 192 | 50 | 1300 | $10^{16}$ | $10^{16}$ |
| Comparative example 3 | 1.6 | 152 | 48 | 1320 | $10^5$ | $10^7$ |
| Comparative example 4 | 1.6 | 210 | 5 | 1580 | $10^0$ | $10^0$ |

Example 5

An IC tray (a length of 310 mm, a width of 140 mm, a height of 8 mm, and an average thickness of 1.5 mm) was molded from a thermoplastic resin composition having the formulation shown in Example 3, obtained in the above-described method using an injection molding machine (SG150M, manufactured by Sumitomo Heavy Industries, Ltd.) at a cylinder temperature of 340° C., a mold temperature of 150° C., an injection molding setting rate of 70%, an injection pressure of 1400 kg/cm² and a retention pressure of 800 kg/cm², to provide an excellent article with no warping. This IC tray was subjected to thermal treatment at 180° C. for 1 hour in a hot air circulating oven, to cause no warping and deformation.

The thermoplastic resin compositions of the present invention and heat-resistant trays for IC that are molded using the same are excellent in heat-resistance and mechanical strength, and they are useful products which can endure drying of IC at high temperature and are excellent in handling properties.

What is claimed is:

1. A thermoplastic resin composition in which 5 to 45 parts by weight of carbon fiber and 0.1 to 10 parts by weight of conductive carbon black having a DBP (dibutyl phthalate) oil absorption of 150 ml/100 g or more are compounded per 100 parts by weight of resin components comprising 15 to 55% by weight of an aromatic polycarbonate resin and 85 to 45% by weight of an aromatic polysulfone resin.

2. The thermoplastic resin composition according to claim 1, wherein the ratio ($\eta a/\eta b$) of the melt viscosity ($\eta a$) of the aromatic polycarbonate resin to the melt viscosity ($\eta b$) of the aromatic polysulfone resin as defined below is from 0.5 to 2.0:

$\eta a$: melt viscosity of an aromatic polycarbonate resin measured at a temperature of 340° C. and a shearing rate of 1216/second;

$\eta b$: melt viscosity of an aromatic polysulfone resin measured at a temperature of 340° C. and a shearing rate of 1216/second.

3. The thermoplastic resin composition according to claim 2, wherein the ratio ($\eta a/\eta b$) is from 0.8 to 1.8.

4. The thermoplastic resin composition according to claim 1, 2 or 3, wherein the aromatic polycarbonate resin is a copolycarbonate or homopolycarbonate using at least 30 mol % or more of bisphenol A as a raw material thereof.

5. The thermoplastic resin composition according to claim 1, 2 or 3, wherein the aromatic polysulfone resin contains 80 mol % or more of a repeating unit represented by the following formula:

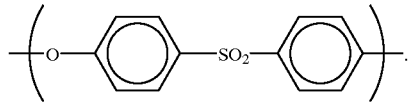

6. A heat-resistant tray for IC obtained by molding the thermoplastic resin composition of claim 1, 2 or 3.

* * * * *